(No Model.)

2 Sheets—Sheet 1.

I. W. HAY.
SAWMILL.

No. 533,951. Patented Feb. 12, 1895.

Witnesses:
B. J. Fowler
William W. Fowler

Inventor,
Isaac W. Hay (No Model.) 2 Sheets—Sheet 2.

I. W. HAY.
SAWMILL.

No. 533,951. Patented Feb. 12, 1895.

Witnesses:
B. F. Fowler
William W. Fowler

Inventor,
Isaac W. Hay.

UNITED STATES PATENT OFFICE.

ISAAC W. HAY, OF JACKSON, DARKE COUNTY, OHIO.

SAWMILL.

SPECIFICATION forming part of Letters Patent No. 533,951, dated February 12, 1895.

Application filed April 1, 1891. Serial No. 387,304. (No model.)

*To all whom it may concern:*

Be it known that I, ISAAC W. HAY, a citizen of the United States, residing at Jackson township, in the county of Darke and State of Ohio, have invented certain new and useful Improvements in Sawmills; and I do declare the following to be a full, clear, and exact description of the invention, such as will enable others skilled in the art to which it appertains to make and use the same.

My invention relates to improvements in saw mills and more particularly to mechanism or gearing for moving a feed carriage or stock toward and from the saw; and it has for its general object to provide a feed mechanism embodying certain adjustable elements whereby the direction of movement of the carriage or stock may be readily changed and the speed thereof increased and diminished when traveling toward or from the saw, and while said carriage or stock is in continuous motion.

Other objects and advantages will be fully understood from the following description and claims when taken in connection with the annexed drawings, in which—

Figure 1:
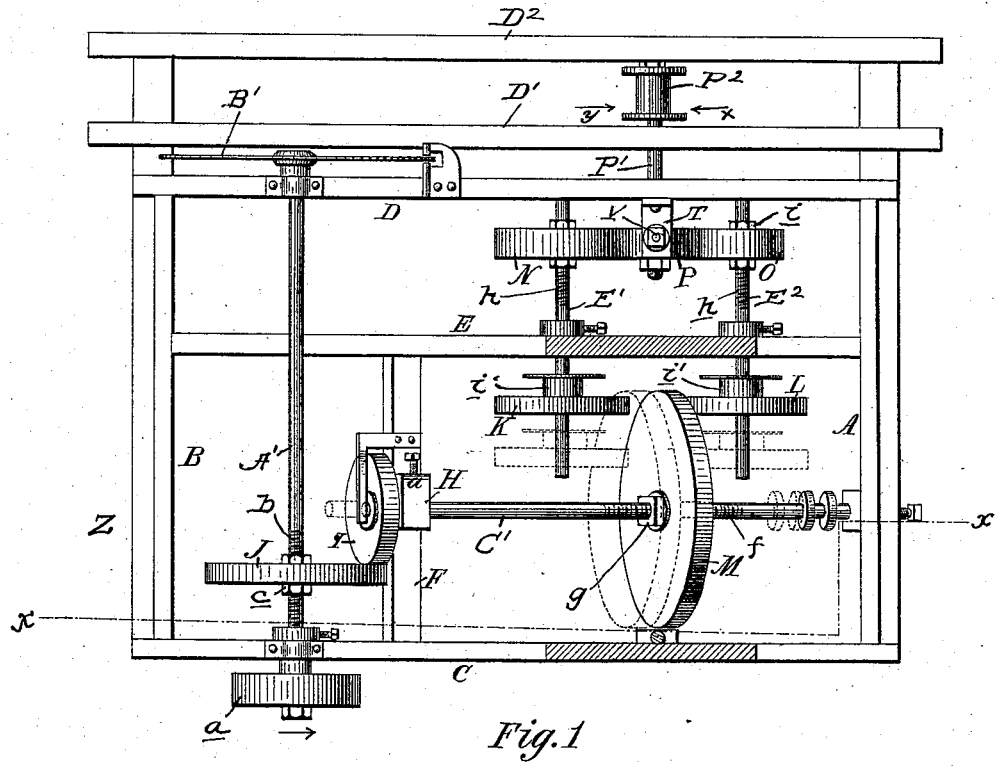
Figure 2:
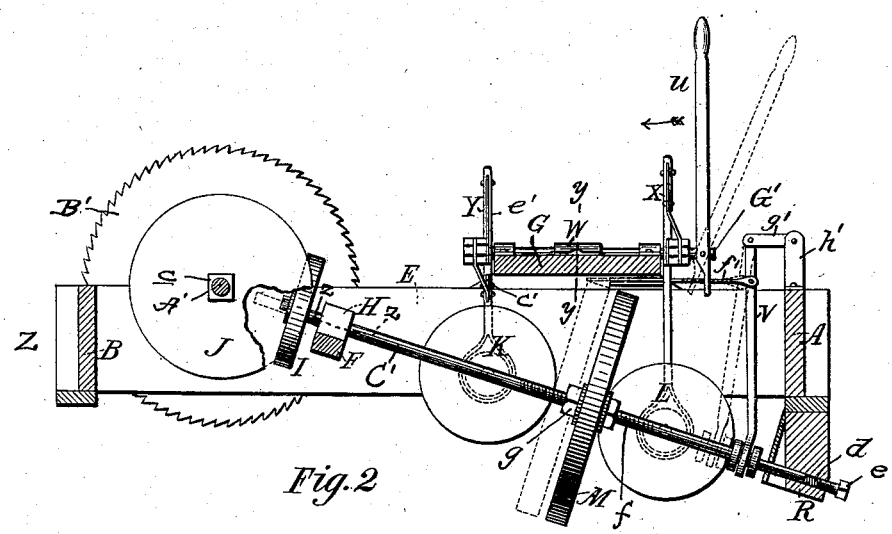
Figure 5:
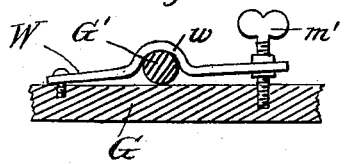
Figure 6:
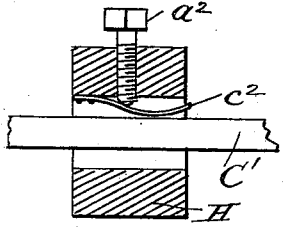
Figure 3:
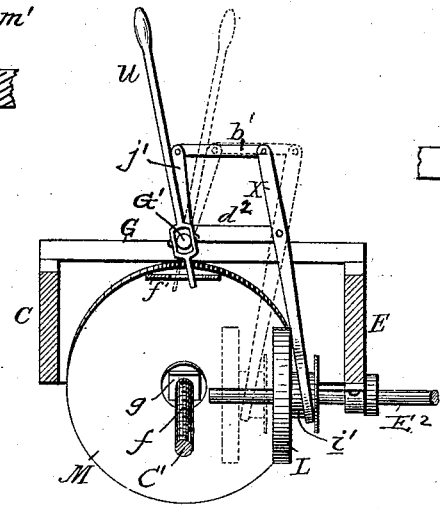
Figure 4:
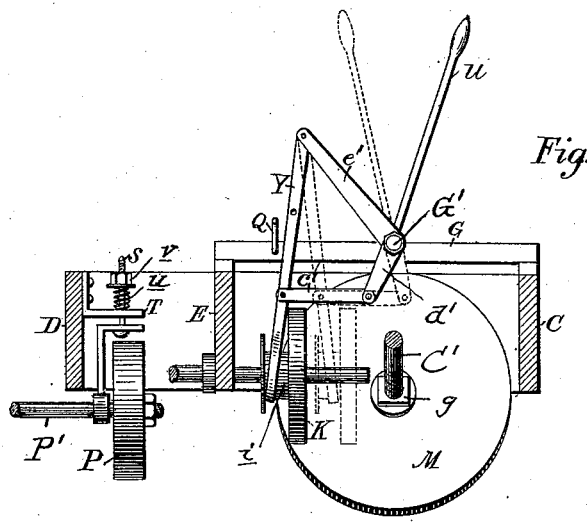

Figure 1, is a plan view of a saw mill embodying my invention; the shifting mechanism and the supporting beam thereof being omitted. Fig. 2, is a vertical, longitudinal section taken in the plane indicated by the line $x, x$, of Fig. 1. Fig. 3, is a detail transverse section taken in a plane in rear of the main, obliquely-disposed disk. Fig. 4, is a similar view taken in a plane in advance of the said disk. Fig. 5, is a detail section taken in the plane indicated by the line $y, y$, of Fig. 2, and Fig. 6, is a similar view taken in the plane indicated by the line $z, z$, of Fig. 2.

In the said drawings, similar letters designate corresponding parts throughout the several views, referring to which—

Z, indicates the main frame of a saw mill, which preferably comprises the longitudinal bars C, E, D, D', and D², the transverse or cross bars A, B, and F, and the transverse beam G, which rests in a plane above the several bars; and A', indicates the main drive shaft which extends transversely of the frame and also serves as an arbor for the saw B', as shown. This transverse shaft A', carries a pulley $a$, at its outer end to receive a belt from a suitable motor, and it is threaded for a portion of its length as shown at $b$, for the engagement of nuts $c$, which serve to adjustably fix a disk or wheel J, as illustrated.

The wheel J, is designed to be frictionally engaged by a wheel or disk I, which is disposed at right angles thereto and is mounted upon the longitudinally adjustable shaft C'. This shaft is journaled adjacent to the wheel or disk I, in a box H, on the bar F, and it has its lower end journaled in a bar R, and backed by a spring $d$, the tension of which is regulated by a screw $e$, for a purpose presently described.

Mounted upon the threaded portion $f$, of the shaft C', and adjustably fixed thereon by nuts as $g$, is the comparatively large disk or wheel M, which is designed to be alternately thrown into engagement with the friction wheels K, and L, of the transverse shafts E', E², as will be presently described. These shafts are threaded for a portion of their length as shown at $h$, and on said threaded portions are secured by nuts as $i$, the friction wheels or disks N, O, which engage the friction wheel P, of the shaft P', which also carries the drum P², designed to transmit motion to a carriage or to stock (not illustrated).

The friction wheels N, O, engage the periphery of the wheel P, at diametrically opposite points, and it will therefore be seen that with the pulley $a$, turning in its normal direction, indicated by the arrow, and the wheel M, in engagement with the wheel L, the wheel O, will turn the wheel P, and the drum P², in the direction indicated by arrow $x$, so as to move the carriage or stock toward the saw; while when the wheel M, is moved into engagement with the wheel K, the wheel N, will turn the wheels P, and P², in the opposite direction indicated by arrow $y$, so as to move the carriage or stock away from the saw.

The normal position of the wheel or disk M, by reason of the spring $d$, is midway between the wheels or disks K, L, and in order to move said wheel M, into engagement with either of the wheels K, L, I have provided the hand lever U. This lever is pivotally mounted at an intermediate point of its length upon a longitudinally disposed rock-shaft G', and it is adjustably connected through the medium of the threaded rod $f'$, with a swinging lever V, which is pivotally connected at its upper end to a strap $g'$, carried by a standard $h'$, and has its lower end forked so as to rest between and engage the fixed collars of the shaft C'. Thus it will be seen that when the lever U, is moved forwardly in the direction indicated by the arrow, the wheel M, will be carried into engagement with the wheel L, so as to move the carriage or stock toward the saw, and when said lever U, is moved rearwardly or in a direction opposite to that indicated, the wheel M, will engage the wheel K, and a reverse or rearward movement of the stock or carriage will take place.

The wheels K, L, are keyed or feathered upon their shafts so that they may be made to engage the wheel M, at various points from the center thereof, and consequently transmit a fast or slow motion to the stock or carriage; and the said wheels are provided as shown, with collars $i'$, $i'$, for the engagement of the forked ends of the levers Y, X, through the medium of which they are adjusted.

The lever Y, of the wheel K, is pivotally connected at its upper end to a link $e'$, carried by the rock shaft G', and it is also detachably connected at an intermediate point in its length to a link $c'$, which is connected at its opposite end to a crank arm $d'$, fixed on the rock shaft. Thus it will be seen that when the rock shaft is moved laterally toward the right, through the medium of the lever U, the wheel K, will be moved toward the center of the wheel M, and the speed of the return or reverse movement of the carriage or stock will be diminished, and when the rock shaft is moved toward the left, the wheel K, will be moved toward the periphery of the wheel M, and the speed of the carriage or stock will be correspondingly increased.

In some cases it is not desirable to vary the speed of the return or reverse movement of the carriage or stock and I have therefore provided a bearing Q, upon which the lever Y, may be mounted when disconnected from the link $c'$. When so mounted the lever Y, will serve to hold the wheel K, at one distance from the center of the wheel M, and the speed of the return or reverse movement of the stock or carriage will not be varied.

The lever X, of the wheel L, has its upper end pivotally connected to a link $b'$, which in turn is pivotally connected to a crank arm $j'$, fixed on the rock shaft; and said lever X, is also pivotally connected at an intermediate point of its length to a link $d^2$, carried by the rock shaft. Thus when the lever U, is moved laterally to the right as indicated by arrow, the wheel L, will be moved toward the center of the wheel M, and the speed of the forward movement of the carriage or stock will be diminished, while when the lever is moved toward the left and the wheel L, is carried away from the center of wheel M, the speed of the carriage or stock in its forward movement will be correspondingly increased.

By reason of the construction thus far described, it will be noted that the operator may quickly and conveniently, through the medium of a single lever, reverse the direction of movement of the carriage or stock and may increase or diminish the speed of movement irrespective of the direction in which the carriage or stock is traveling.

As better shown in Fig. 4, of the drawings, the shaft P', of the friction wheel P, is journaled in a hanger $t$, which has an angular branch at its upper end for the passage of a bolt S, which takes through a fixed bracket T, and serves to connect the hanger thereto. The bolt S, is surrounded above the bracket T, with a coiled spring $u$, and it is provided above said spring with an adjustable nut $v$, through the medium of which the tension of the spring may be readily regulated. By this manner of mounting the shaft of the wheel P, it will be seen that said shaft will be yieldingly held against the wheels N, O, and will be more positively engaged thereby.

In order to hold the rock shaft G', against casual movement and consequently prevent casual movement of the wheels K and L, upon their shafts, I have provided the friction plate W, having the concave $w$, better shown in Fig. 5. This plate W, is preferably formed from spring steel and it has one end fixed as shown while its other end is secured by the screw $w'$, which also serves to adjust the plate so as to increase or diminish the friction, as desired. I have also provided in the box H, as better shown in Fig. 6, a spring $c^2$, which is designed to bear upon the shaft C', and hold the wheel I, against the wheel J. This spring $c^2$, is engaged by the screw $a^2$, which is designed to regulate its tension, so as to increase or diminish the friction between the wheels I, J, as desired.

It will be noted from the foregoing description taken in connection with the drawings, that a gearing or mechanism such as embodied in my invention will impart a free and easy motion to the carriage or stock and the same will not be subject to the shock and jar incidental to the employment of cog, gearing, and the like.

I have specifically described the construction and relative arrangement of the several elements of my improved mechanism in order to impart a full and clear understanding of the same, but I do not desire to be understood as confining myself to such specific construction and arrangement as I reserve the right to make, in practice, such changes or modifications as fairly fall within the scope of my invention.

Having described my invention, what I claim is—

1. In a feed mechanism for saw mills, the combination with a main frame, two transverse shafts journaled in the main frame, wheels mounted on said shafts, a longitudinally-adjustable, rotatable shaft journaled in the main frame and disposed in a plane at right angles to the transverse shafts and having a wheel resting between and adapted to be moved into engagement with the wheels of the transverse shafts, and a suitable means for adjusting said longitudinally adjustable shaft; of a spring backing one end of the longitudinally adjustable shaft and adapted to normally hold the wheel thereof out of engagement with the wheels of the transverse shafts, and a screw for regulating the tension of said spring, substantially as and for the purpose set forth.

2. In a feed mechanism for saw mills, the combination with two transverse shafts, friction wheels fixed to rotate with and adjustable on said shafts and a longitudinally, adjustable, rotatable shaft disposed in a plane at right angles to the transverse shafts, and having a friction wheel resting between and adapted to be moved into engagement with the adjustable friction wheels of the transverse shafts; of a rock shaft, mechanism intermediate of the said rock shaft and the friction wheels of the transverse shafts adapted when the rock shaft is rocked to move said wheels, a lever fulcrumed upon and adapted to rock the rock shaft, and mechanism intermediate of said lever and the longitudinally-adjustable shaft adapted when the lever is moved on its fulcrum, to impart an endwise movement to said shaft, substantially as and for the purpose set forth.

3. In a feed mechanism for saw mills, the combination with a main frame, a fixed bearing or hanger Q, a transverse shaft journaled in said frame, and a friction wheel fixed to rotate with and adjustable on the transverse shaft; of a rock shaft, having a crank arm $d$, a suitable means for operating the rock shaft, a lever Y, connected at its upper end to link $e'$, carried by the rock shaft and also engaging and adapted to move the adjustable friction wheel, and a link $c'$, connected at one end to the crank arm $d'$, of the rock shaft and detachedly connected at its opposite end to the lever Y, whereby said lever may be disconnected when desired and hung upon the bearing Q, substantially as and for the purpose set forth.

4. In a feed mechanism for saw mills, the combination with two transverse shafts, and wheels mounted on said shafts; of an oblique longitudinally - adjustable, rotatable shaft resting in a plane at right angles to the transverse shafts and having a wheel resting between and adapted to be moved into engagement with the wheels of the transverse shaft, a spring bearing against the lower end of the longitudinally-adjustable shaft, and a suitable means for adjusting said shaft, substantially as specified.

In testimony whereof I affix my signature in presence of two witnesses.

ISAAC W. HAY.

In presence of—
A. C. RUPEL,
JOSEPH GRIM.